US012661295B2

(12) United States Patent
McElroy, Jr.

(10) Patent No.: US 12,661,295 B2
(45) Date of Patent: Jun. 23, 2026

(54) INTERMENT CYLINDER

(71) Applicant: Robert Cecil McElroy, Jr., Lady Lake, FL (US)

(72) Inventor: Robert Cecil McElroy, Jr., Lady Lake, FL (US)

( * ) Notice: Subject to any disclaimer, the term of this patent is extended or adjusted under 35 U.S.C. 154(b) by 0 days.

(21) Appl. No.: 19/077,968

(22) Filed: Mar. 12, 2025

(65) Prior Publication Data

US 2026/0026993 A1 Jan. 29, 2026

Related U.S. Application Data

(60) Provisional application No. 63/674,468, filed on Jul. 23, 2024.

(51) Int. Cl.
*A61G 17/08* (2006.01)
*E04H 13/00* (2006.01)

(52) U.S. Cl.
CPC ........... *A61G 17/08* (2013.01); *E04H 13/008* (2013.01)

(58) Field of Classification Search
CPC .............................. A61G 17/08; E04H 13/008
See application file for complete search history.

(56) References Cited

U.S. PATENT DOCUMENTS 3,726,052 A * 4/1973 Thompson ............ E04H 13/003 52/27
3,898,718 A * 8/1975 Eubank ................... E04H 13/00 27/29
4,328,606 A * 5/1982 Nunes .................. A61G 17/007 27/35
6,052,954 A * 4/2000 Dudek ............... A61G 17/0136 52/141
6,055,793 A * 5/2000 Irwin ..................... A61G 17/08 53/436
6,421,890 B1 * 7/2002 Biggar ................... A61G 17/08 220/23.88
6,463,703 B1 * 10/2002 Mattis ................... E04H 13/003 52/103
6,904,721 B1 * 6/2005 Forbes .................. E04H 13/008 52/103

(Continued)

FOREIGN PATENT DOCUMENTS

KR 2025006423 A * 1/2025

*Primary Examiner* — William L Miller
(74) *Attorney, Agent, or Firm* — Dunlap Bennett & Ludwig PLLC; Anna L. Kinney

(57) ABSTRACT

An interment cylinder includes a tube for cremation urns and a lid with attachment hardware. The tube has a weighted structure or base and a flanged collar. The collar mouth accesses an interior of the tube. The lid conforms to the mouth and aligns with the flange. The attachment hardware is threaded through the flange and the lid to re-openably seal the tube. An interment apparatus includes an encasement body with a first face and one or more interment cylinders. The first face has lifting grips and the mouth of the tube is accessible from the first face. A method for interring cremains in a gravesite includes embedding the interment apparatus within a gravesite, using the lifting grips to manipulate the interment apparatus; loading the cremains into the tube; and installing the lid and attachment hardware to seal the tube. The cremains may be cremated, aquamated, resomated, and/or bio-cremains.

13 Claims, 3 Drawing Sheets

(56) References Cited

U.S. PATENT DOCUMENTS

| | | | | |
|---|---|---|---|---|
| 6,988,299 | B1 * | 1/2006 | Barrette | A61G 17/08 27/1 |
| 7,036,195 | B2 * | 5/2006 | Glass | A61G 17/08 27/35 |
| 7,478,461 | B2 * | 1/2009 | Glass | A61G 17/007 27/35 |
| 8,087,132 | B2 * | 1/2012 | Forrest | A61G 17/08 27/1 |
| 8,943,762 | B2 * | 2/2015 | Carlson | E04H 13/008 27/DIG. 1 |
| 8,966,725 | B2 * | 3/2015 | Langelier | A61G 99/00 27/35 |
| 9,441,393 | B1 * | 9/2016 | Muthusami | E04H 13/001 |
| 10,486,855 | B1 * | 11/2019 | Pollman | B65D 21/0228 |
| 11,464,699 | B1 * | 10/2022 | Muthusami | B65D 53/02 |
| 12,065,849 | B2 * | 8/2024 | Garcia | E04H 13/008 |
| 12,084,877 | B2 * | 9/2024 | Griggs | A61G 17/08 |
| 12,329,694 | B1 * | 6/2025 | Bethany | A61G 17/08 |
| 12,523,056 | B2 * | 1/2026 | Bautz | E04H 13/008 |
| 2003/0221300 | A1 * | 12/2003 | Caven | A61G 17/08 27/1 |
| 2004/0098846 | A1 * | 5/2004 | Glass | A61G 17/007 27/29 |
| 2005/0125973 | A1 * | 6/2005 | Hankel | A61G 17/007 27/1 |
| 2011/0191993 | A1 * | 8/2011 | Forrest | A61G 17/007 27/1 |
| 2013/0185907 | A1 * | 7/2013 | Langelier | A61G 17/08 27/1 |
| 2014/0215933 | A1 * | 8/2014 | Carlson | E04H 13/008 52/103 |
| 2018/0023313 | A1 * | 1/2018 | Power | E04H 13/008 52/128 |
| 2022/0316229 | A1 * | 10/2022 | Griggs | E04H 13/008 |
| 2023/0003048 | A1 * | 1/2023 | Garcia | E04H 13/008 |
| 2024/0143258 | A1 * | 5/2024 | Gills | H01M 10/44 |

* cited by examiner

INTERMENT CYLINDER

CROSS-REFERENCE TO RELATED APPLICATION

This application claims the benefit of priority of U.S. provisional application No. 63/674,468, filed Jul. 23, 2024, the contents of which are herein incorporated by reference.

BACKGROUND OF THE INVENTION

The present invention relates to burial or interment apparatuses and, more particularly, to a subterranean interment apparatus with a plurality of interment cases.

Subterranean interment cylinders offer an effective and efficient mechanism for burying cremains. Traditionally, cremains are placed in an interment cylinder and either interred in a columbarium or in ground. In ground interment requires drilling or digging of individual holes for each cylinder which is an inefficient usage of time and resources. Furthermore, if an interment cylinder is not properly weighted, it can be dislodged from the ground during wet soil conditions such as a rainstorm or flood, which can cause loss of interred cremains.

As can be seen, there is a need for a means of simultaneous subterranean interment of a plurality of weighted interment cylinders.

SUMMARY OF THE INVENTION

In one aspect of the present invention, an interment cylinder comprises a tube configured to accommodate a plurality of cremation urns, the tube having a weighted base and a collar with a flange extending radially therefrom, the collar forming a mouth for access to an interior of the tube; a lid configured to conform to the mouth and to align with the flange; and attachment hardware threaded through the flange and lid, operative to re-openably seal the tube.

In another aspect of the present invention, an interment apparatus comprises an encasement body including: permanent or detachable lifting grips disposed on a first face of the encasement body; and one or more of the interment cylinder, wherein the mouth of the tube is accessible from the first face.

In yet another aspect of the present invention, a method for interring in a gravesite at least two cremains selected from the group consisting of cremated, aquamated, resomated, bio-cremains, and any combination thereof comprises providing the interment apparatus; embedding the interment apparatus within a gravesite, using the lifting grips to manipulate the interment apparatus; loading the at least two cremains into the tube; and installing the lid and attachment hardware to seal the tube.

These and other features, aspects and advantages of the present invention will become better understood with reference to the following drawings, description, and claims.

DETAILED DESCRIPTION OF THE INVENTION

Figure 1:
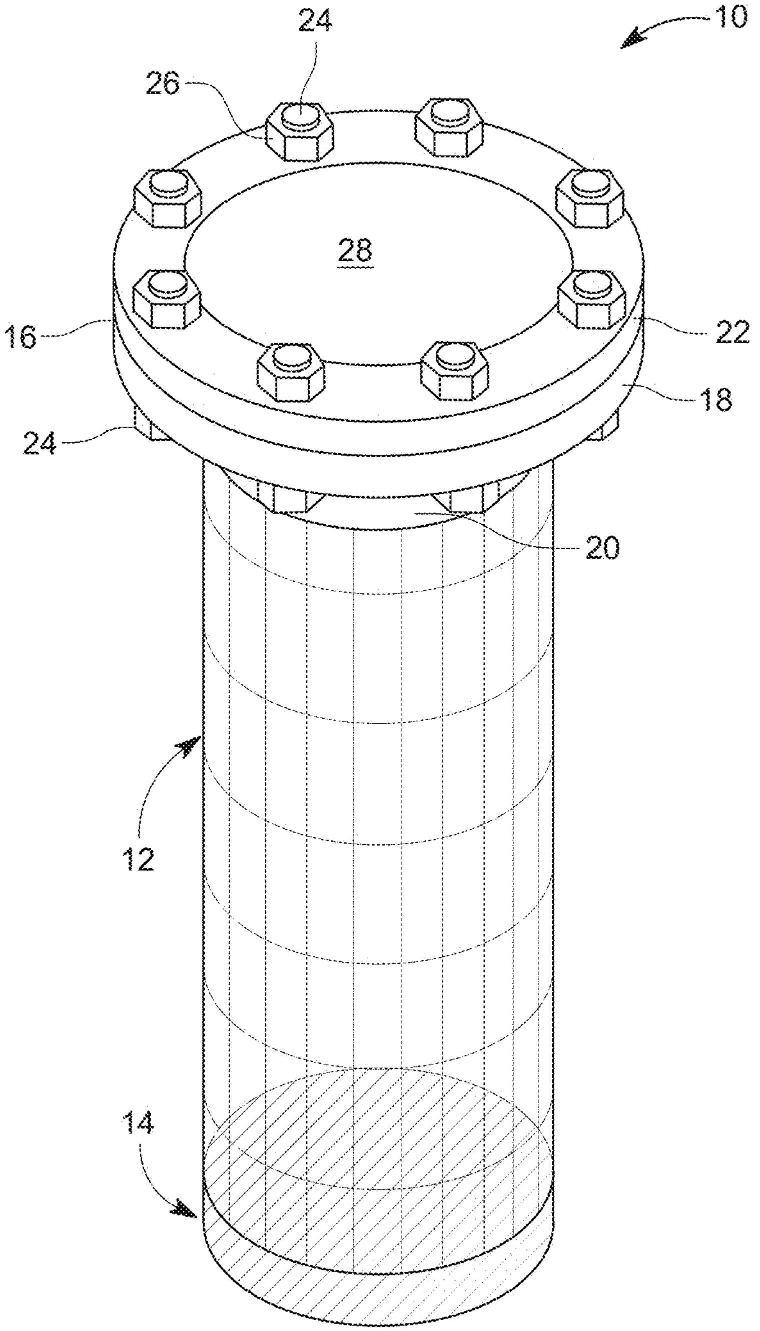
FIG. 1 is a perspective view of an interment cylinder according to an embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a unitary encased interment cylinder apparatus. The interment cylinder may be configured to contain multiple urns.

In embodiments, the interment cylinder may have a top, lid, or cap mated to a circular flange formed in the mouth of the cylinder. The top may be bolted to the flange with nuts and bolts. A gasket may be present between the top and the flange, compressed by the bolts to form a watertight seal. Any suitable number of bolts may be used, such as about 8 bolts. In other embodiments, the cap may be hingedly joined to the mouth of the cylinder and may be sealable by way of bolt(s) or clamp.

The tubes may be made of any suitable material, such as but not limited to polyvinyl chloride, stainless steel, aluminum, bronze, and any combination thereof.

A plurality of lifting points can be installed on one face of the encasement apparatus to provide attachment points for straps, cables, or other material for disinterment of the encasement apparatus. In embodiments, the plurality of lifting points can be made from durable material, such as commodity metals, and can be installed during the casting or forming process of the encasement.

In embodiments, the one-piece encasement apparatus can be cast or otherwise formed as a cuboid, rectangular prism, frustum, etc., with a plurality of faces, but is not so limited.

In embodiments, the one-piece encasement apparatus is formed from a durable material of sufficient weight to prevent dislodgement due to soil saturation from precipitation, such as concrete or commodity metals. For example, the material may be selected from the group consisting of: metals, composites, concrete, hempcrete, self-healing concrete, ashcrete, fiber cement, ferrock, bamboo concrete, and any combination thereof.

Advantageously, the one-piece encasement apparatus can reduce duplicated interment efforts by allowing for digging or drilling of one hole to inter a plurality of cremains.

In embodiments, each of the plurality of cases can be embedded permanently in the encasement and can have an opening in one face of the one-piece encasement. Thus, the face of the encasement may have a plurality of cylindrically shaped apertures. In embodiments, the plurality of cases can each include a lid, or cap, which can be flush mounted or proud mounted with the one face of the encasement.

In embodiments, the number, size, height, volume, depth, and/or shape of the plurality of interment cases within the apparatus can be customized to a specific installation requirement. The size and the number of encased interment cylinders is not particularly limited.

In embodiments, the apparatus may include a number of customizable parameters which can be selected prior to formation to suit the needs of an installation. For example, the size, height, weight, depth, and/or shape of the encasement apparatus can be customized to a specific installation requirement.

To make and use the unitary interment encasement, the cylinder and encasement apparatus can be formed according to selected parameters. After formation, a plurality of cremains can be interred within the plurality of cylindrical cases in a one-to-one correspondence and the cases can then be capped or sealed. A hole of suitable size and shape can be dug, or otherwise created, and the apparatus can be placed within the hole utilizing the plurality of lifting points to manipulate the apparatus.

In some embodiments, the bottom, cylinder and top flange may be manufactured monolithically as a single piece by rotational mold. A gasket and cap formed to conform to the mouth of the cylinder/top flange may be installed onto the unitary cylinder component. Without being bound to any particular dimensions, the cylinders may suitably be molded to have 8 inch, 10 inch, or 12 inch diameters and 2 foot to 8 foot lengths.

Figure 2:
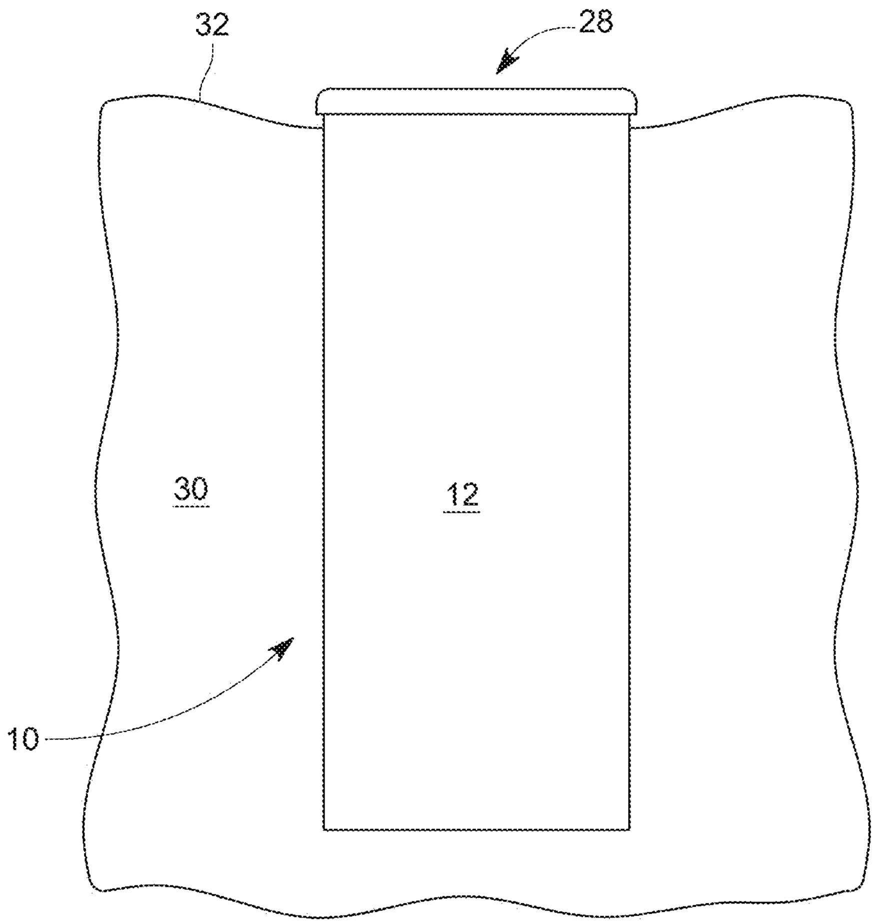
FIG. 2 is a front elevation schematic view of the interment cylinder of FIG. 1 in an interred position.
Figure 3:
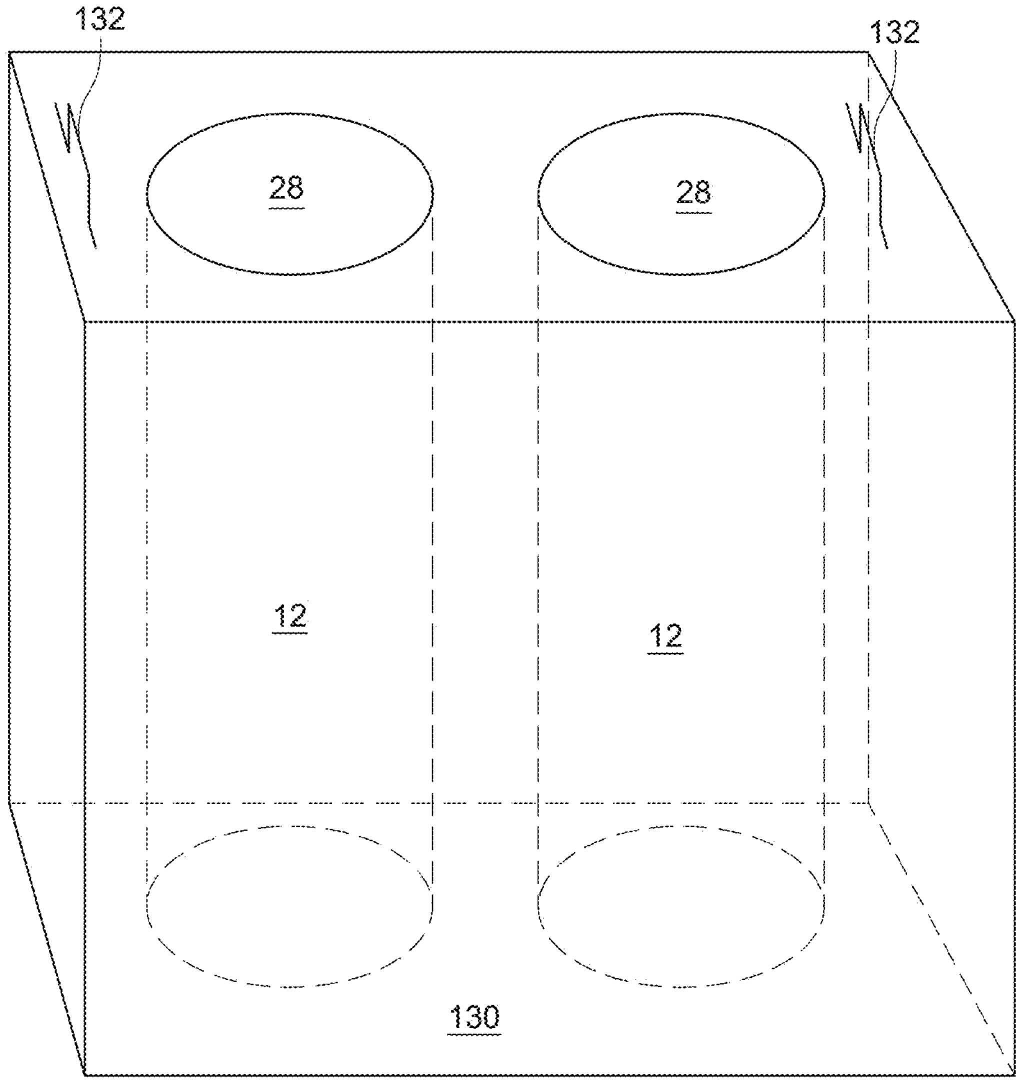
FIG. 3 is a perspective schematic view of an encasement apparatus according to another embodiment of the present invention, including the interment cylinder of FIG. 1.

Referring to FIGS. 1-3, FIG. 1 illustrates an interment cylinder 10 having a weighted base 14, a sidewall 12, an upper collar 20 with a flange 18, and a lid 28 with a flange 22 mated to the cylinder flange 18. A gasket 16 may be compressed between the lid flange 22 and the collar flange 18. The lid 28 is removably attached to the cylinder 10 by way of attachment hardware, such as bolts 24 and nuts 26 or the upper collar 20 could be threaded to accept the bolts 24 so as to not require nuts 26.

As shown in FIG. 2, the interment cylinder 10 may be interred in soil 30 to the upper collar 20, with at least the lid 28 and flange 22 elevated above the ground surface 32 for accessibility.

Turning to FIG. 3, multiple cylinders 10 may be embedded in a concrete or aggregate block 130, with the sidewalls 12 encased in the concrete 130 and the lid 28 with flange 22 elevated above the concrete surface. Hangers 132 embedded in the concrete 130 surface enable lifting and transport of the concrete block 130 with the embedded cylinders 10, for example for movement to another burial site.

It should be understood, of course, that the foregoing relates to exemplary embodiments of the invention and that modifications may be made without departing from the spirit and scope of the invention as set forth in the following claims.

What is claimed is:

1. An interment apparatus comprising:
an interment cylinder, comprising:
a tube configured to accommodate a plurality of cremation urns, the tube having a base, a sidewall rising from the base, and a collar joined to the sidewall distal from the base, the collar having a flange extending radially therefrom, the collar forming a mouth for access to an interior of the tube;
a lid configured to conform to the mouth, wherein the lid is operative to re-openably seal the tube; and
attachment hardware operative to secure the lid to the tube; and
an encasement body having a first face, wherein the tube is embedded in the encasement body such that the mouth of the tube is accessible from the first face.

2. The interment apparatus of claim 1, wherein the base is a weighted base.

3. The interment apparatus of claim 1, wherein the interior of the tube is configured to accommodate a circular shape of the plurality of cremation urns.

4. The interment apparatus of claim 1, wherein the interior of the tube is configured to accommodate a non-circular shape of the plurality of cremation urns.

5. The interment apparatus of claim 1, wherein the encasement body is made from a material selected from the group consisting of: metal, concrete, hempcrete, self-healing concrete, ashcrete, fiber cement, ferrock, bamboo concrete, and any combination thereof.

6. The interment apparatus of claim 1, further comprising lifting grips disposed on the first face.

7. A method of interring in a gravesite at least two cremains selected from the group consisting of cremated, aquamated, resomated, bio-cremains, and any combination thereof, the method comprising:
providing the interment apparatus of claim 1;
embedding the interment apparatus within the gravesite;
loading the at least two cremains into the tube; and
installing the lid and the attachment hardware to seal the tube.

8. The method of claim 7, wherein the steps of loading and installing occur before the step of embedding.

9. The interment apparatus of claim 1, further comprising a gasket positioned between the lid and the flange, wherein the attachment hardware compresses the gasket to form a watertight seal.

10. The interment apparatus of claim 1, wherein the tube is made from stainless steel.

11. The interment apparatus of claim 1, wherein the tube and collar are manufactured as a single piece by rotational molding.

12. The interment apparatus of claim 2, wherein the weighted base, the tube, and the collar are manufactured as a single piece by rotational molding.

13. The interment apparatus of claim 1, wherein the attachment hardware comprises bolts threaded through the flange and the lid.

* * * * *